(12) United States Patent
Winner et al.

(10) Patent No.: US 6,326,887 B1
(45) Date of Patent: Dec. 4, 2001

(54) VEHICLE PARKING AID SYSTEM

(75) Inventors: Hermann Winner, Karlsruhe; Martin Noll, Muggensturm; Dirk Schmid, Renningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/417,441

(22) Filed: Oct. 13, 1999

(30) Foreign Application Priority Data

Oct. 13, 1998 (DE) .............................................. 198 47 013

(51) Int. Cl.[7] .................. B60Q 1/00; G08G 1/16
(52) U.S. Cl. .................. 340/435; 340/436; 340/903; 340/932.2; 180/167; 180/199; 367/91
(58) Field of Search ..................... 340/435, 436, 340/903, 932.2; 180/167, 199, 169; 367/87, 91, 93, 909

(56) References Cited

U.S. PATENT DOCUMENTS

| | | | |
|---|---|---|---|
| 5,572,484 | * 11/1996 | Gaus et al. ............................ | 340/435 |
| 6,072,391 | * 6/2000 | Suzuki et al. ........................ | 340/468 |
| 6,091,323 | * 7/2000 | Kawai .................................. | 340/435 |
| 6,163,253 | * 12/2000 | Yaron et al. .......................... | 340/436 |

OTHER PUBLICATIONS

Lerner et al: "Driver Backing Behaviour Research: Implications for Backup Warning Devices", Transportation Research Board 76th Annual Meeting, JA. 1997, Washington, D.C.*

* cited by examiner

*Primary Examiner*—Donnie L. Crosland
(74) *Attorney, Agent, or Firm*—Michael J. Striker

(57) ABSTRACT

A parking aid system for a vehicle includes a device that measures the instantaneous distance of a vehicle part from an obstacle located in its path and generates at least one output signal indicative of the measured distance, as well as a device capable of issuing warning signals. An evaluating unit is connected between the measuring device and the warning device. The evaluating device dynamically determines, as a function of vehicle speed, an instantaneous distance limit value, compares the measured distance value with the respective distance limit value and activates the warning device when the measured distance value is smaller than the respective distance limit value to alert the driver of the vehicle to the presence of the obstacle. The distance limit value may be determined by adding a first distance value independent of the speed of the vehicle and a second distance value linearly proportional to the speed of movement of the vehicle. The proportionality constant for the second distance value is at least equal to at least one of the reaction time of the driver, the reaction time of the measuring means, the dead time of the braking system of the vehicle and the time that is required to stop the vehicle after the braking system has become effective.

12 Claims, 3 Drawing Sheets

VEHICLE PARKING AID SYSTEM

BACKGROUND OF THE INVENTION

FIELD OF THE INVENTION

The present invention relates to vehicles in general, and more particularly to a parking aid system for a motor vehicle.

DESCRIPTION OF THE RELATED ART

There are already known various constructions of parking aid systems of the kind here under consideration. One example of such a system is currently being offered by the assignee hereof under the designation Parkpilot System. A significant use of such systems is to facilitate the drive's maneuvering of the vehicle in hard to survey and tight traffic conditions, especially those attendant to parking, in that the driver is warned of obstacles that are present in the vehicle's direction and/or path of movement and the distance of which from the vehicle is smaller than a predetermined limiting distance. Such traffic obstacles may be constituted by stationary objects such as, for instance, relatively low-lying street delimitation markers (curbs) or scattered objects which cannot be seen from the driver's seat of the motor vehicle because they are situated too close to the vehicle, but just as well by moving obstacles that newly appear in or penetrate into the vehicle movement path out of the vision field of the driver, such as, for instance, other users of the road, animals, etc.

The known Parkpilot System mentioned above detects the distance of such an obstacle from a delimiting edge or portion of the vehicle and generates an optical or an acoustic warning signal when it is detected that the measured distance is less than a first distance limit. The warning signal changes its characteristic each time the measured distance falls below another, smaller, distance limit, so that the driver is apprised by the nature of the issued signal of the extent of the danger of colliding with the object and is thus able to steer or operate the motor vehicle accordingly.

This system makes it possible for the careful driver to reliably avoid collisions while negotiating a relatively difficult traffic situation, such as parallel parking into a relatively small space. However, this known system also suffers from the significant disadvantage that a driver who does not expect that an obstacle could be present in or enter the path of movement of the vehicle and hence causes the vehicle to back up at a relatively high speed would not be able to bring the vehicle to a complete halt in the time left between the issuance of the warning signal and the collision of the vehicle with the obstacle.

The heretofore known parking aid systems of this kind could not take this consideration into account except by increasing the limit distance that triggers the issuance of the respective warning signal when the actually measured distance of the vehicle from the object falls below it. However, is not practical to employ this solution because any increase in this distance limit increases the danger of issuance of warning signals that are not warranted by the actually encountered situation. The real danger of the issuance of a substantial number of such unwarranted warning signals over time is that it may cause the driver to ignore even such signals that are warranted, thus making the system ineffective, even to the extent of losing its reason for existence altogether. In addition, it does not make much sense to increase the distance limit to such an extent that it reaches into the region of the prospective path of travel of the vehicle that the driver is able to clearly observe from his or her position within the vehicle.

From Lerner et al, Driver Backing Behavior Research: Implications for Backup Warning Devices, Transportation Research Board $76^{th}$ Annual Meeting, Washington, D.C., January 1997, there is known a system that warns the driver of a backwards moving vehicle when the time that is calculated by the system as remaining before the vehicle runs into an obstacle is less than a limit value of 1.5 to 2 seconds. In this system, however, there exists the problem that the speed of movement of the vehicle has to be measured with a high degree of precision in order to be able to obtain a meaningful forecast of the time remaining until collision with an obstacle, especially when driving at relatively low speeds which is typical for parking and similar motor vehicle maneuvering operations. The lower the movement speed, the smaller are the distances driven per time unit, and accordingly the higher is effect of the relative measuring error occurring in the measurement of vehicle speed. As the speed of movement of the vehicle approaches zero, the remaining time before collision approaches infinity, so that no warning is issued. Therefore, the warning system proposed by Lerner et al is ill suited for use while conducting parking maneuvers.

OBJECTS OF THE INVENTION

Accordingly, it is a general object of the present invention to avoid the disadvantages of the prior art.

More particularly, it is an object of the present invention to provide a parking air system that does not possess the drawbacks of the known systems of this type.

Still another object of the present invention is to devise a system of the type here under consideration which is well suited for apprising the driver of the vehicle equipped with it in a timely fashion of the impending danger of collision between the vehicle and an obstacle, without increasing the incidence of unwarranted warnings to any meaningful extent.

It is yet another object of the present invention to design the above system in such a manner as to not require a high degree of precision in the measurement of the speed of movement of the vehicle.

A concomitant object of the present invention is so to construct the system of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a parking aid system for a vehicle which includes means for measuring the instantaneous distance of a predetermined portion of the vehicle from an obstacle located in the path of at least prospective movement of such a portion, and for generating at least one output signal having an instantaneous actual distance value indicative of such a measured distance and means for issuing warning signals. In accordance with the invention, this system further includes evaluating means that is interposed between the measuring means and the issuing means, being operative for dynamically determining, as a predetermined function of a movement condition of the vehicle, an instantaneous distance limit value representative of a far limit of a range in the path, comparing the actual distance value with the distance limit value, and activating the issuing means when the comparison reveals that the actual distance value is smaller than the distance limit value to alert the driver of the vehicle to the presence of the obstacle within the range. A particular advantage of the system as described so far is that the extent and/or distance of the range relative of the vehicle is dependent on the manner in which the vehicle is being driven at that time so that the warning signal is issued when the distance is larger when the vehicle is being driven less cautiously than when the driver is more circumspect in driving the vehicle, thus issuing the danger signal in a timely fashion in both instances.

Inasmuch as the evaluation means dynamically determines the distance limit value in dependence on the condition or manner in which the vehicle is being driven, it gives the driver, even at relatively higher speeds of movement of the vehicle, a sufficient amount of reaction time that is needed to reliably bring the vehicle to a complete stop before it encounters the obstacle. Since this system utilizes not the time but rather the distance as the criterion for establishing the distance limit value, it avoids the problems existing in the system of Lerner et al at relatively low speeds, and it render it possible for the system to provide the vehicle driver with meaningful information even if the vehicle is at a complete standstill.

In order to provide the vehicle driver with as comprehensive information as possible or feasible, it is proposed in accordance with an advantageous aspect of the present invention that the issuing means be operative for issuing at least two distinguishable warning signal types and that the evaluating means be further operative for additionally performing the dynamic determining and comparing for at least one additional limit of at least one additional range located father away in the path from the vehicle portion than the initially mentioned range, and activating that of the warning signal types which corresponds to that of the ranges within which the obstacle is situated at that time. In this manner, the parking air system of the present invention presents to the vehicle driver a sequence of mutually distinguishable warning signals as the vehicle progressively approaches the obstacle, with these signals giving the driver a quantitative impression about the extent of the collision danger.

Advantageously, the distance limit value corresponds to less than about 1.5 meters when the speed of movement of the vehicle into the path is at zero.

The system may obtain the information needed for the evaluation of the driving condition of the vehicle from a signal representative of the vehicle's own speed. To this end, there my be used for instance a signal derived from wheel angular speed detection sensors or by resorting to the use of optical, radar or ultrasound techniques for scanning the surface over which the vehicle is moving to detect the movement of the vehicle relative thereto. What is important is that the measuring technique chosen be capable of providing good resolution especially in the lower speed range.

In the alternative, the evaluation unit may be constructed in such a manner as to be capable of determining the change in the distance of the vehicle from the obstacle as a function of elapsed time and hence the relative speed of the vehicle with respect to the obstacle, and to establish the instantaneous distance limit value or values on the basis of this information.

The taking of the absolute or relative speed of movement of the vehicle into consideration can be accomplished in accordance with the present invention by using the result of adding a first distance value independent of the speed of the vehicle and a second distance value linearly proportional to the speed of movement of the vehicle into the path as the function used by the evaluating means in determining the distance limit value.

The aforementioned second distance value advantageously includes a proportionality constant that is preferably a fixed time value that should not be less, according to the invention, than either one of the following times:

a) the reaction time of the driver (here, a value of between 0.2 and 0.6 seconds may be assumed), b) the reaction time of the measuring means, c) the dead time of the braking system of the vehicle, and d) the time required to bring the vehicle to a standstill after the braking system has become effective.

Inasmuch as the deceleration attending the braking of the vehicle also depends on factors external to the vehicle, such as road conditions, the time needed to completely stop the vehicle can only be roughly estimated on the basis of an estimated value for the braking deceleration. A suitable estimated value for current braking systems lies at about 5 m/s$^2$.

The safety obtainable by using the parking aid system of the present invention can be further enhanced by making the proportionality constant not smaller than the sum of two, three or, preferably, all four of the above time values.

On the other hand, however, it is not very practical to make the time interval substantially greater than the sum of the above time values, because otherwise there would exist the danger that the system would issue a warning signal when the obstacle would still be at a relatively huge distance from the vehicle, the driver of the vehicle would bring the vehicle to a complete stop at a "safe" distance from the obstacle, come to the conclusion that the warning was redundant or inappropriate, and would ignore corresponding warnings in the future.

When a driver starts braking the vehicle in response to the issuance of the warning signal, the distance limit value associated with this warning signal that has been determined dynamically on the basis of the previously encountered driving condition can be reduced as a result of the diminishing speed attending the braking to such an extent that it becomes smaller than the distance to the obstacle that had triggered the issuance of this warning signal in the first place. Should the warning signal be terminated or its character changed under these circumstances, there would exist the danger that the driver would assume that the obstacle had been removed and, consequently, react to such perceived change in conditions in a wrong manner that could potentially have a detrimental impact. In order to eliminate this risk, it is proposed in accordance with another facet of the present invention that the evaluating means be operative for switching the issuing means from that of the warning signal types that corresponds to the range to the warning signal type corresponding to the additional range, or shutting the warning signal off altogether, only upon determination that the instantaneous distance of the portion of the vehicle from the obstacle is increasing, that is that the vehicle and the obstacle are actually moving away from one another.

It is further advantages when the issuing means is operative for issuing a further type of warning signal type clearly discernible from that of the warning signal, and when the evaluating means is further operative for activating the issuing means for issuing the further warning signal type when the instantaneous distance limit signal value exceeds that corresponding to the effective measuring distance of the measuring means, that is when the vehicle moves so fast that an effective warning issuance by the parking aid system is no longer possible.

A currently preferred application of the parking aid system of the present invention is during the rearward movement of the vehicle in order to determine the distance of the vehicle from obstacles located behind the vehicle. To achieve this purpose, the parking aid system is situated on the vehicle in an appropriate way. So, for instance, the aforementioned portion of the vehicle may be the rear bumper of the vehicle, and the measuring means may include a plurality of distance sensors arranged in the rear bumper.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
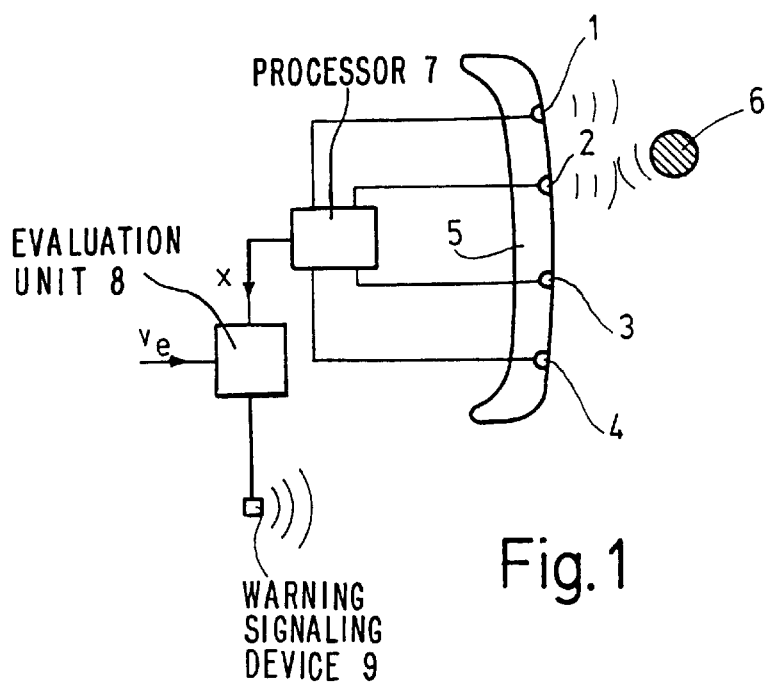
FIG. 1 is a diagrammatic view showing a parking aid system of the present invention, generally as observed from above.

Referring now to the drawing in detail, and first to FIG. 1 thereof, it may be seen that it shows, in a highly simplified, diagrammatic, fashion, the construction of a parking aid system in which the present invention is embodied. This system includes a plurality of sensors exemplified by those identified by the reference numerals 1, 2, 3, and 4, which are shown to be arranged within a rear bumper 5 of a motor vehicle and may be and advantageously are constructed as ultrasound transceivers. When the parking aid system of this type is in operation, the ultrasound transceivers 1, 2, 3, and 4 emit ultrasound pulses from their locations within the rear bumper 5 in the rearward direction as considered relative to the motor vehicle equipped with this system. If an obstacle, for instance a fence post, is present behind the vehicle, as indicated at 6, it will reflect a part of the energy of such ultrasound waves back in the direction of the vehicle and hence towards the ultrasound transceivers 1 to 4. These transceivers 1 to 4 then pick up this incoming or returned echo and issue corresponding signals that are sent to a processing unit 7. This processing unit 7 determines from the time period elapsed between the time of issuance of the respective ultrasound pulse by the associated sensor 1, 2, 3 or 4 and that of its return the distance of the rear bumper 5 from the obstacle 6 and forwards the result in the form of a distance signal x to an evaluation unit 8. In accordance with the invention, the evaluation unit 8 further receives a signal $v_e$ that is indicative of the vehicle's own speed. This signal $v_e$ may be derived, for instance, from the output signals that are being issued by wheel rotational speed sensors that may be already present at the wheels of the vehicle, for simultaneous use in the operation of a braking power regulation system (e.g. ABS).

On the basis of the signal $v_e$, the evaluation unit 8 determines a number of distance limit values. When the estimated danger of collision of the vehicle with the obstacle 6 that is established in this manner exceeds the first, lowest limit value, the evaluation unit 8 turns on a warning signal issuance device 9, so that the latter produces a first type of a warning signal in order to indicate to the vehicle driver the existence of a relatively minuscule but not insignificant collision danger. Upon exceeding each further limit value, the warning signal issuance device 9 is activated in such a manner as to emit another type of a warning signal to thereby alert the driver in a step-wise manner of the progressively increasing collision danger.

The warning signal issuance device 9 may be constituted by an optical signal issuance device, for instance an indicator field within another instrument or elsewhere on the vehicle dashboard, whose color, for instance, changes with the exceeding of each limit value, for example green for no danger, yellow for intermediate danger, and red for high danger. Another possibility is a blinking light situated, for instance, in the front passenger compartment, the blinking frequency of which increases with increasing danger. However, the warning signal issuance device may also be constructed as an acoustic signal issuance device, for instance a buzzer or a loudspeaker, which is operated with different frequencies or pulse repetition rates, amplitudes or audible signal strength levels, or tone or pitch levels, in dependence on the imminence, immediacy or increasing level of the collision danger.

Figure 5:
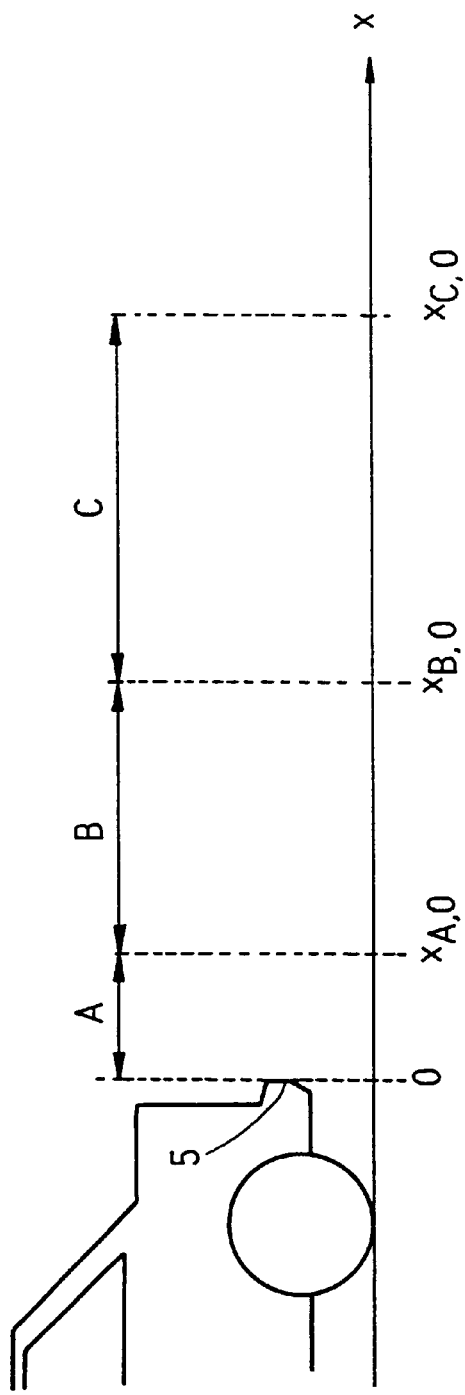
FIG. 5 is a view akin to those of FIGS. 3 and 4 but showing, for the purpose of comparison, the behavior of a parking aid system of the present invention with a conventional construction of such a system.

For a better understanding of the operation of the arrangement according to the present invention, the operation of a conventional parking aid system will be briefly addressed first with reference to FIG. 5 of the drawing. This FIG. 5 shows the rear portion of a motor vehicle, including the rear bumper 5 in which there are accommodated, as in the situation described before, appropriate distance measuring sensors (not specifically shown or indicated here). These sensors measure the distance of an obstacle, if any, from the vehicle at any particular time; then, depending on whether such an obstacle is situated in one of three danger zones A, B or C, corresponding to distance ranges between 0 and $x_{A,0}$, $x_{B,0}$ and $x_{C,0}$, and $x_{B,0}$ and $x_{C,0}$, respectively, a warning signal of a character associated with the danger zone A, B or C in question is issued. If no obstacle is present behind the vehicle, or if the distance of a detected obstacle exceeds $x_{C,0}$, no warning signal is issued. In a parking aid system of this kind, it can happen that, if the speed of backward movement of the vehicle is relatively high, an obstacle may penetrate into the region C, for instance, due to the frame of reference moving with the vehicle or otherwise, and trigger an alarm signal; however, before the driver can react to it and bring the vehicle to a standstill, the vehicle has already collided with the obstacle.

Figure 2:
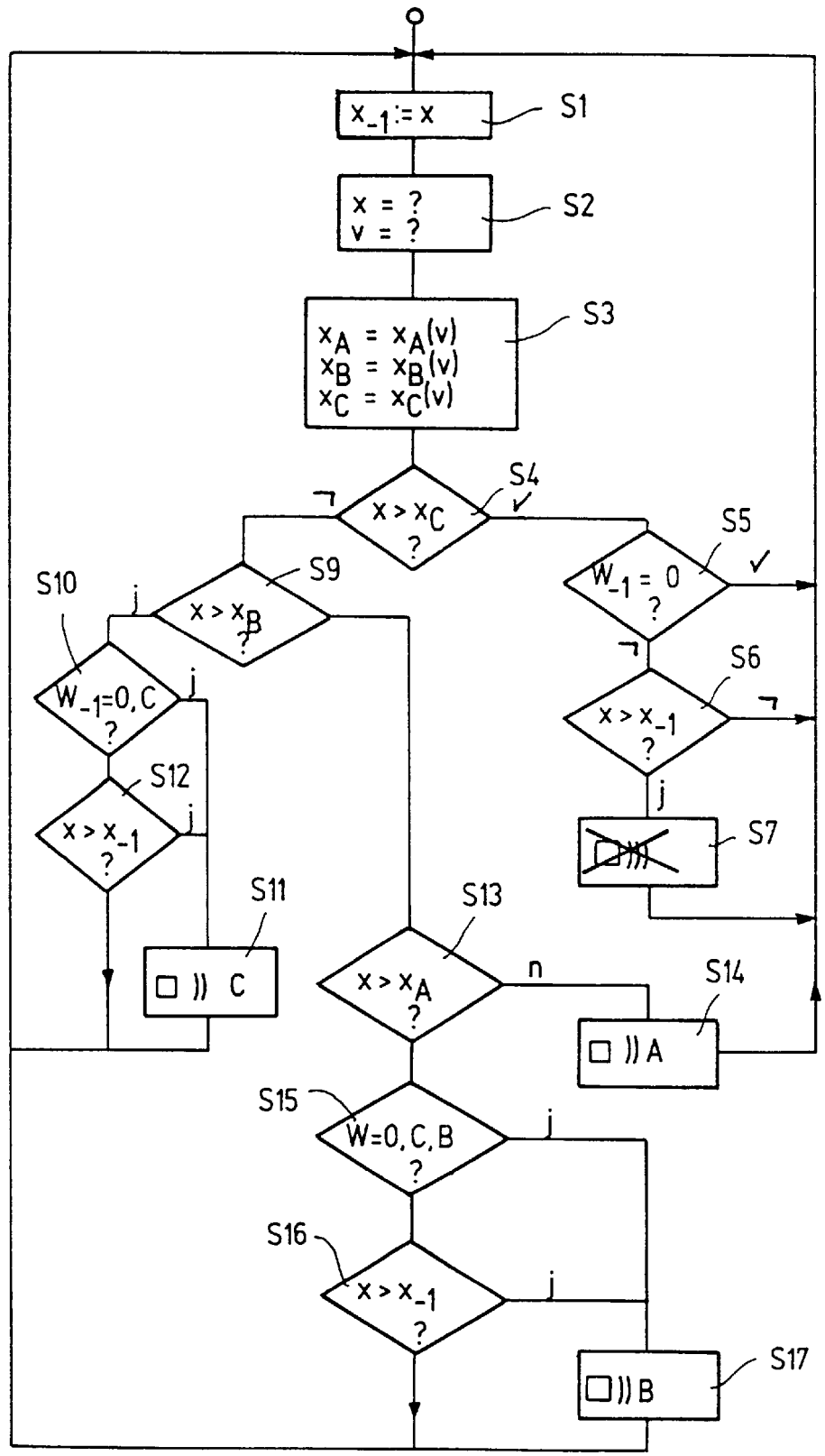
FIG. 2 is a flow diagram depicting the operation of a parking aid system embodying the present invention.

The present invention avoids this problem in a manner that will probably be best understood by initially considering its operation as it is indicated in the flow diagram of FIG. 2. The operation shown in this flow diagram is repeated at relatively short time intervals, thus assuring that the vehicle driver is informed of any existing obstacles to the vehicle movement with as short a delay as possible or feasible. In step S1, a measured value of distance x of the vehicle from an obstacle that had been acquired during the immediately preceding performance of the process shown in the flow diagram is stored as a value $x_{-1}$, and the actually existing warning or alarm state—no warning or warning in the form indicative of the zone A, B or C—is stored as well. In step S2, the evaluation unit 8 captures the actual instantaneous value x of the distance of the vehicle from an obstacle, as well as the speed v of backward movement of the vehicle. This speed v may be either the vehicle's own speed as measured relative to the pavement, or a relative speed of the vehicle as measured with respect to the obstacle. On the basis of the speed v, the evaluation unit 8 determines in step S3 respective instantaneous distance limit values $x_A$, $x_B$ and $x_C$ with which the actual distance of the vehicle from the obstacle is to be compared. The distance limit values $x_A$, $x_B$ and $x_C$ may be determined, for example, from an equation $x_i = x_{i,0} + vt$, wherein i=A, B or C, respectively, and t is a time period that may amount to the sum of the reaction time of the driver, the reaction time of the measuring equipment that is constituted by the ultrasound sensors 1 to 4 and the processing unit 7, the dead time of the braking system that elapses between the stepping on the brake pedal and the onset of the braking action, and the braking time needed for bringing the vehicle to a standstill. As far as the braking time is concerned, a predetermined estimated value can be used for it, or it can be precisely calculated in dependence on the vehicle's own speed v on the basis of a typical deceleration value of 5 m/s$^2$.

Subsequently to the gathering and/or calculation of these values, the distance x of the vehicle from the obstacle is compared with the thus obtained distance limit values $x_A$, $x_B$ and $x_C$. If it is determined in step S4 that the actual distance x exceeds the largest distance limit value $x_C$, it is examined in step S5 if the stored warning signal state (indicated in the drawing as $W_{-1}$) if "off". If that is the case, then the evaluation process loops back to step S1; if not, then it is further examined in step S6 how the distance x of the vehicle from the obstacle has developed or changed since the last time the process was run. If the distance has increased, the warning signal, if it was previously on, is switched off (in step S7); otherwise, the process loops immediately back to step S1.

If x is smaller than $x_C$, it is compared in step S9 with $x_B$. If the value of x exceeds that of $x_B$, examination is made in step S10 to determine if the actual warning state is "off" or if the warning signal is on indicating the penetration of the C zone. When the warning state signal indicates the "off" condition, a warning signal indicative of the presence of an obstacle in the zone C is switched on in step S11; when this is not the case, the change in the distance from the obstacle is further taken into consideration in step S12. If this distance is decreasing, the warning signal in the form indicative of the zone C is switched on if it was not already on from before; otherwise, the process loops back directly to step S1, so that a warning signal switched on during a previous run through the process in the form indicative of the presence of an obstacle in the zone A or B remains active.

If x is smaller than $x_B$, it is compared in step S12 with $x_A$. If x<$x_B$, then the warning signal about the obstacle presence in the zone A is issued under all circumstances (at step S14); otherwise, an examination and actualization of the then applicable warning state is performed in steps S15 to S17 in a manner analogous to that discussed above with respect to the steps 10 to 12.

Figure 3:
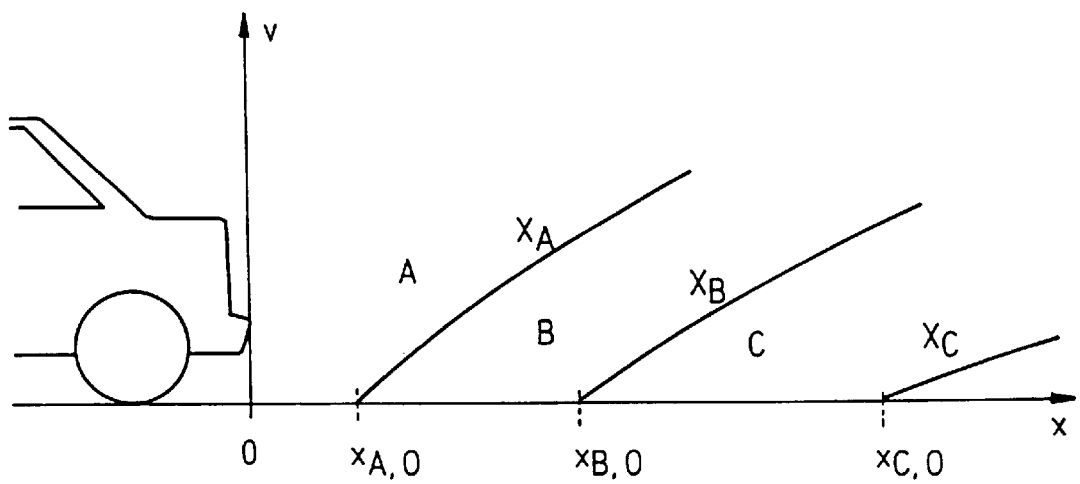
FIG. 3 is a diagram showing the behavior of an implementation of a parking aid system according to the present invention.

FIG. 3 of the drawing illustrates the result of the process described above in conjunction with the flow diagram of FIG. 2, in the form of characteristic behavior line diagram. In the same manner as discussed above in relation to FIG. 5 of the drawing, the rearward distance x from the vehicle bumper within which an obstacle may be present is plotted along the abscissa of the diagram, with the frame of reference (the diagram) once more moving with the vehicle. The speed of the vehicle (either the vehicle's own or absolute speed, or its relative speed) is plotted along the ordinate. It can be ascertained from this diagram, for any arbitrarily selected combination of vehicle rearward motion speed and distance of an obstacle from the vehicle's rear bumper, in which of the aforementioned warning zones A, B and C, if any, this obstacle is disposed. Respective boundaries $x_A$, $x_B$ and $x_C$ between the warning zones A, B and C extend, in this instance, along curved, substantially parabolic, courses. These boundaries intersect the abscissa at the points $x_{A,0}$, $x_{B,0}$ and $x_{C,0}$ which correspond to the identically identified points of FIG. 5. Thus, it may be seen that, should the speed of rearward movement of the vehicle be zero, the parking aid system of the present invention would behave exactly the same way as the conventional one in accordance with FIG. 5. However, as the speed of the rearward movement of the vehicle increases, so does the extent of the zone A that corresponds to the highest danger of collision, and the zones B and C are shifted to higher distances if not increased in extent as well. This increase and possibly shift reflect the increase in the distance required to brake the vehicle at progressively higher speeds.

Figure 4:
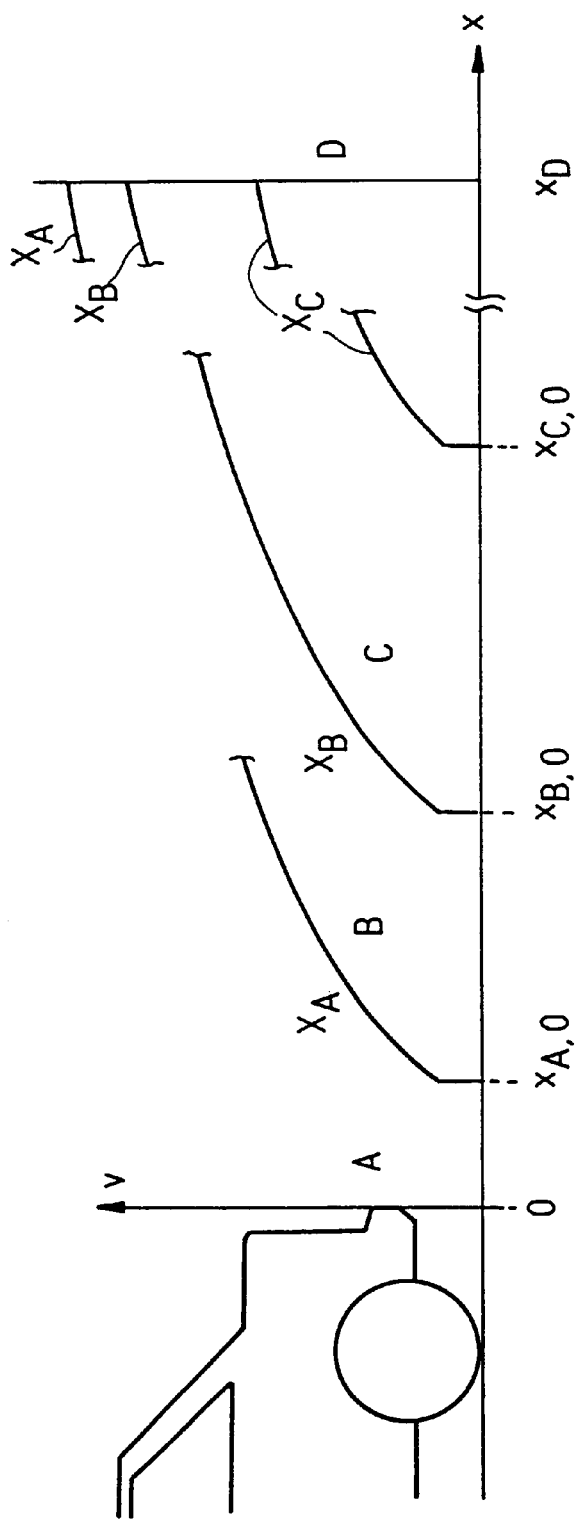
FIG. 4 is a view corresponding to that of FIG. 3 but showing the behavior of a somewhat modified implementation of the parking aid system of the present invention.

FIG. 4 shows a corresponding characteristic line diagram in which the same convention has been used as before as far as the frame of reference and the warning zone delimitation are concerned, but for a slightly different approach to the operation of the parking aid system of the present invention than that described above. One difference between the graph of FIG. 4 and that of FIG. 3 is that the warning zone delimitation limit curves or lines $x_A$, $x_B$ and $x_C$ extend substantially vertically at their portions corresponding to relatively low speeds. This approach is based on the consideration that, in order to keep the switching structure as simple as possible, relatively low speeds, which can be measured only with difficulty at a sufficient degree of accuracy, may be safely neglected on a short-time basis in the estimation of the future distance between the vehicle and the obstacle in the parking aid system of this implementation because they contribute only insignificantly to the required braking distance.

A further difference, which is independent from the one mentioned just above and hence may be used in conjunction with the solution revealed in FIG. 3 as well, is the introduction of a fourth region D. The range within which the sensors 1 to 4 have the capability of providing precise distance measurements is limited, being indicated at $x_D$. The intersection point of the characteristic curve $x_A$ with the straight line x=$x_D$ gives the limiting speed above which bringing the vehicle to a complete halt within the measuring range of the measuring equipment is no longer possible with certainty. This means that, if this limiting speed is exceeded, the parking aid system is no longer effective. The driver of the vehicle is apprised of the existence of this condition by a kind of a warning signal that is preferably clearly distinguishable from the other warning signal forms. So, for instance, should the signals associated with the regions A, B and C be acoustic pulse signals with varying frequency or repetition rate, then the signal associated with the region D may be a signal with a differentiated tone pitch or with a clearly distinguished pulse repetition behavior.

It will be understood that each of the elements described above, or two or more together, may also find a useful application in other types of constructions differing from the type described above. So, for instance, the present invention is evidently not limited to the number of warning regions described above in conjunction with the examples presented there; rather, there may be used one, two, or even more than three of such warning regions. Moreover, the various warning signal forms, with the exception of the one described above as being indicative of the zone D, may continuously or gradually merge with or blend into each other.

While the present invention has been described and illustrated herein as embodied in a specific construction of a parking aid system, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim:

1. A parking aid system for a vehicle, comprising means for measuring the instantaneous distance of a predetermined portion of the vehicle from an obstacle located in the path of at least prospective movement of such a portion, and for generating at least one output signal having an instantaneous actual distance value indicative of such a measured distance; means for issuing warning signals; and evaluating means interposed between said measuring means and said issuing means and operative for dynamically determining, as a predetermined function of a movement condition of the vehicle, an instantaneous distance limit value representative of a far limit of a range in said path, comparing said actual distance value with said distance limit value, and activating said issuing means when said comparison reveals that said actual distance value is smaller than said distance limit value to alert the driver of the vehicle to the presence of the obstacle within said range.

2. The parking aid system as defined in claim 1, wherein said issuing means is operative for issuing at least two distinguishable warning signal types; and wherein said evaluating means is further operative for additionally performing said dynamic determining and comparing for at least one additional limit of at least one additional range located father away in said path from said vehicle portion than said range, and activating that of said warning signal types which corresponds to that of said ranges within which said obstacle is situated at that time.

3. The parking aid system as defined in claim 2, wherein said evaluating means is operative for switching said issuing means from that of said warning signal types that corresponds to said range to the warning signal type corresponding to said additional range only upon determination that said instantaneous distance of said portion of the vehicle from said obstacle is increasing.

4. The parking aid system as defined in claim 1, wherein said distance limit value corresponds to less than about 1.5 meters when the speed of movement of the vehicle into said path is at zero.

5. The parking aid system as defined in claim 1; and further comprising means for supplying to said evaluating means a signal representative of the instantaneous speed of movement of the vehicle.

6. The parking aid system as defined in claim 1, wherein said function used by said evaluating means in determining said distance limit value is the result of adding a first distance value independent of the speed of the vehicle and a second distance value linearly proportional to the speed of movement of the vehicle into said path.

7. The parking aid system as defined in claim 6, wherein said second distance value includes a proportionality constant that is at least equal to at least one of the reaction time of the driver, the reaction time of said measuring means, the dead time of the braking system of the vehicle, and the time required to bring the vehicle to a standstill after the braking system has become effective.

8. The parking aid system as defined in claim 7, wherein said proportionality constant is at most equal to the sum of all of said times.

9. The parking aid system as defined in claim 1, wherein said issuing means is operative for issuing a further type of warning signal type clearly discernible from that of said warning signal; and wherein said evaluating means is further operative for activating said issuing means for issuing said further warning signal type when said instantaneous distance limit signal value exceeds that corresponding to the effective measuring distance of said measuring means.

10. The parking aid system as defined in claim 1, wherein said measuring means is so disposed on the vehicle as to measure the distances to obstacles located behind the vehicle.

11. The parking aid system as defined in claim 10, wherein said portion is the rear bumper of the vehicle; and wherein said measuring means includes a plurality of distance sensors arranged in said rear bumper.

12. A parking aid system for a vehicle, comprising means for measuring an instantaneous distance of a predetermined portion of the vehicle from an obstacle located in the path of at least prospective movement of said predetermined portion and for generating at least one output signal having an actual distance value indicative of the instantaneous distance;

means for issuing warning signals; and evaluating means including means for dynamically calculating an instantaneous distance limit value representative of a far limit of a range in said path by adding a first distance value independent of vehicle speed and a second distance value linearly proportional to the speed of movement of the vehicle into said path, means for comparing said actual distance value with said instantaneous distance limit value and means for activating said means for issuing warning signals so as to issue one of the warning signals when said comparing reveals that said actual distance value is smaller than said distance limit value.

* * * * *